United States Patent
Green et al.

(10) Patent No.: US 7,609,825 B2
(45) Date of Patent: Oct. 27, 2009

(54) METHOD AND APPARATUS FOR AUTOMATED BILLING AND CREDITING OF CUSTOMER ACCOUNTS

(75) Inventors: Antonio Green, Austin, TX (US); Jonathan Paden, Austin, TX (US); Bobby Sams, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1012 days.

(21) Appl. No.: 11/178,651

(22) Filed: Jul. 11, 2005

(65) Prior Publication Data

US 2007/0025533 A1    Feb. 1, 2007

(51) Int. Cl.
*H04M 15/00*    (2006.01)
*H04M 3/00*     (2006.01)

(52) U.S. Cl. .......................... 379/114.04; 379/265.01; 379/265.03

(58) Field of Classification Search ............... 379/1.01, 379/32.01, 32.04, 111, 114.01, 112.01, 114.03, 379/114.04, 121.01, 265.01, 265.03
See application file for complete search history.

(56) References Cited

U.S. PATENT DOCUMENTS

| | | | |
|---|---|---|---|
| 5,822,410 A * | 10/1998 | McCausland et al. | 379/114.01 |
| 5,870,456 A | 2/1999 | Rogers | |
| 6,049,599 A * | 4/2000 | McCausland et al. | 379/111 |
| 6,195,420 B1 | 2/2001 | Tognazzini | |
| 6,567,657 B1 * | 5/2003 | Holly et al. | 455/408 |
| 2002/0198830 A1 | 12/2002 | Randell et al. | |
| 2004/0267559 A1 | 12/2004 | Hinderer et al. | |
| 2005/0102231 A1 | 5/2005 | Remington et al. | |

FOREIGN PATENT DOCUMENTS

| | | |
|---|---|---|
| MX | PA02010673 | 7/2004 |
| WO | WO 03010951 | 2/2003 |

* cited by examiner

*Primary Examiner*—Binh K Tieu
(74) *Attorney, Agent, or Firm*—Akerman Senterfitt; Ed Guntin

(57) ABSTRACT

An account management system (100) is coupled to a service center (101) serving a number of customers (108). The account management system has a communications interface (110), a memory (104), and a controller (102). The controller is programmed to monitor (202) service outages of the service center, detect (204) a service outage, identify (206) one or more customers affected by the service outage, and assign (208) a credit to each of the affected one or more customers.

22 Claims, 3 Drawing Sheets

METHOD AND APPARATUS FOR AUTOMATED BILLING AND CREDITING OF CUSTOMER ACCOUNTS

FIELD OF THE INVENTION

This invention relates generally to account management systems, and more particularly to a method and apparatus for automated billing and crediting of customer accounts.

BACKGROUND OF THE INVENTION

Large service providers today employ a number of service agents to address customer needs such as billing, new services, service cancellations, and technical support, just to mention a few. With respect to billing, often times customers call to dispute charges such as an incorrect charge, a charge for service during outages, over billing, and so on. Many times the resolution for these disputes is routine and simple to resolve. However, because of call volumes, there are instances when service agents cannot serve customers in a timely manner, or are overburdened by routine requests.

A need therefore arises for a method and apparatus to automate billing and crediting of customer accounts.

SUMMARY OF THE INVENTION

Embodiments in accordance with the invention provide a method and apparatus for automated billing and crediting of customer accounts.

In a first embodiment of the present invention, an account management system is coupled to a service center serving a plurality of customers. The account management system has a computer-readable storage medium having computer instructions for monitoring service outages of the service center, detecting a service outage, identifying one or more customers affected by the service outage, and assigning a credit to each of the affected one or more customers.

In a second embodiment of the present invention, an account management system is coupled to a service center serving a plurality of customers. The account management system has a communications interface, a memory, and a controller. The controller is programmed to monitor service outages of the service center, detect a service outage, identify one or more customers affected by the service outage, and assign a credit to each of the affected one or more customers.

In a third embodiment of the present invention, an account management system is coupled to a service center serving a plurality of customers. The account management system operates according to a method having the steps of monitoring service outages of the service center, detecting a service outage, identifying one or more customers affected by the service outage, and assigning a credit to each of the affected one or more customers.

DETAILED DESCRIPTION OF THE DRAWINGS

Figure 1:
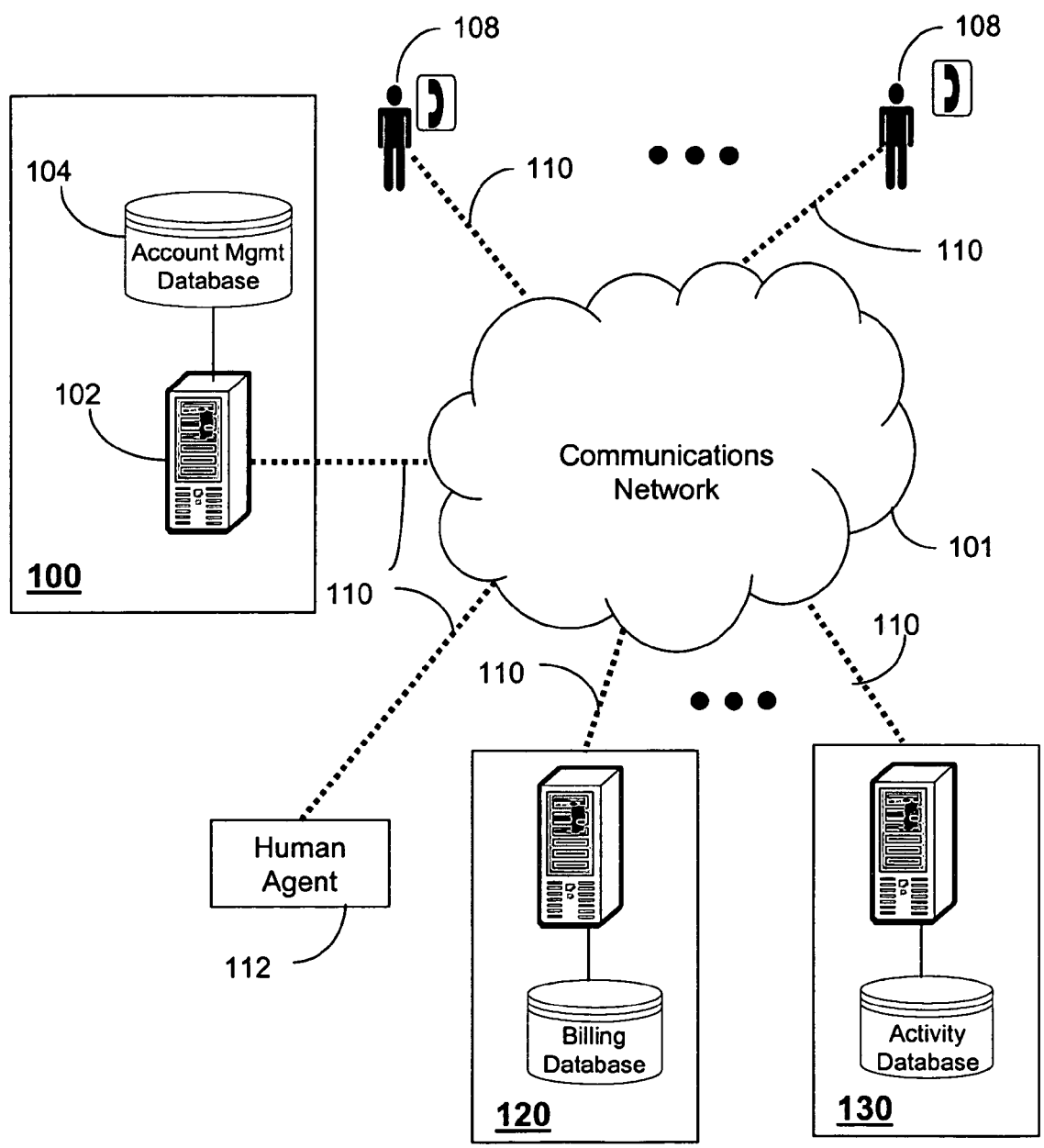
FIG. 1 is block diagram of an account management system coupled to a communications network serving customers according to an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 1 is block diagram of an account management system (AMS) 100 coupled to a communications network 101 serving customers 108 according to an embodiment of the present invention. The AMS 100 comprises a communications interface 110, a memory 104 and a controller 102. The communications interface 110 utilizes conventional wired or wireless communications technology for interfacing to the communications network 101. The communications interface 110 can represent a circuit switched and/or a packet switched interface. Internet or traditional voice services can be provided by network 101 to customers 108. Thus, the communications network 101 can support multiple services such as: VoIP (Voice over Internet communications, IPTV (Internet Protocol Television), broadband communications, cellular telephony, and other known or future communication services.

The controller 102 utilizes conventional computing technology such as a desktop computer, or a scalable server. The memory 104 utilizes conventional mass storage media such as a high capacity disk drive, and can be used by the controller 102 to manage a database in accordance with the present invention. The AMS 100 can also use conventional applications such as an IVR (Interactive Voice Response) application, and/or a CRM (Customer Relations Management) application for interacting with customers 108 and managing account information, respectively.

By way of the communications interface 110, the AMS 100 can access independently operated remote systems such as a billing system 120 and/or an activity-based tracking system 130 that can provide information such as customer usage, identification of affected customers during system outages, and other relevant information pertaining to operations of network 101. The AMS 100 can also perform updates on, for example, the billing system 120 as it processes customer calls in accordance with the invention. It will be appreciated that in the alternative the remote systems 120 and 130 can be in whole or in part an integral part of the AMS 100. Where the AMS 100 is unable to serve particular customer requests, it can direct such callers to one or more human agents 112 of the service provider as needed.

The communication network 101 in the present illustration represents an embodiment of a service center that the AMS 100 can support according to the invention. It will become exceedingly obvious to an artisan with skill in the art from the descriptions below that a service center can take numerous other embodiments not discussed herein. Thus, any service enterprise for which customers can request and/or dispute billing information in relation to services offered to said customers is considered to be within the scope and spirit of the claimed invention.

Figure 2:
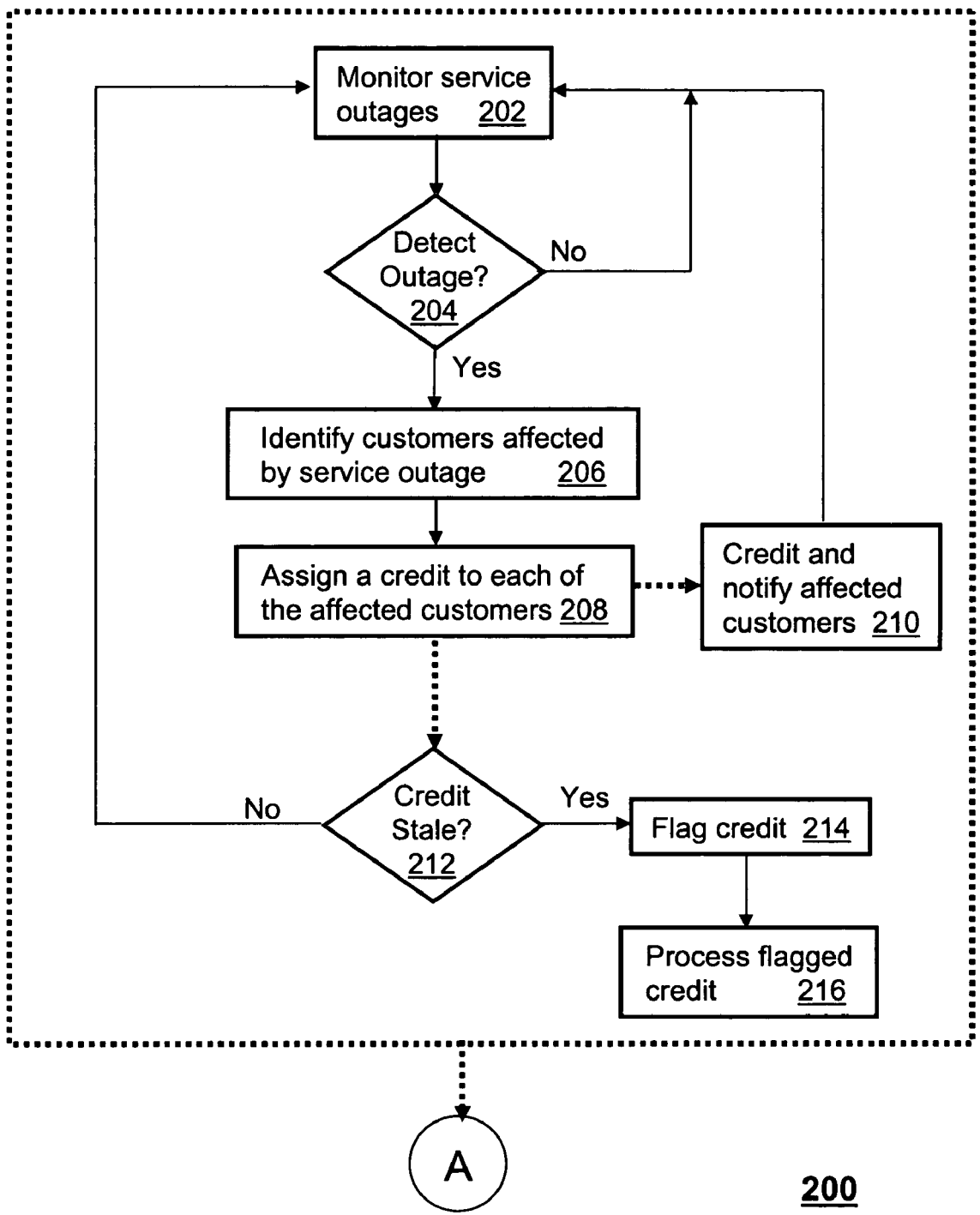
FIGS. 2-3 depict flowcharts of a method operating in the account management system according to an embodiment of the present invention.
Figure 3:
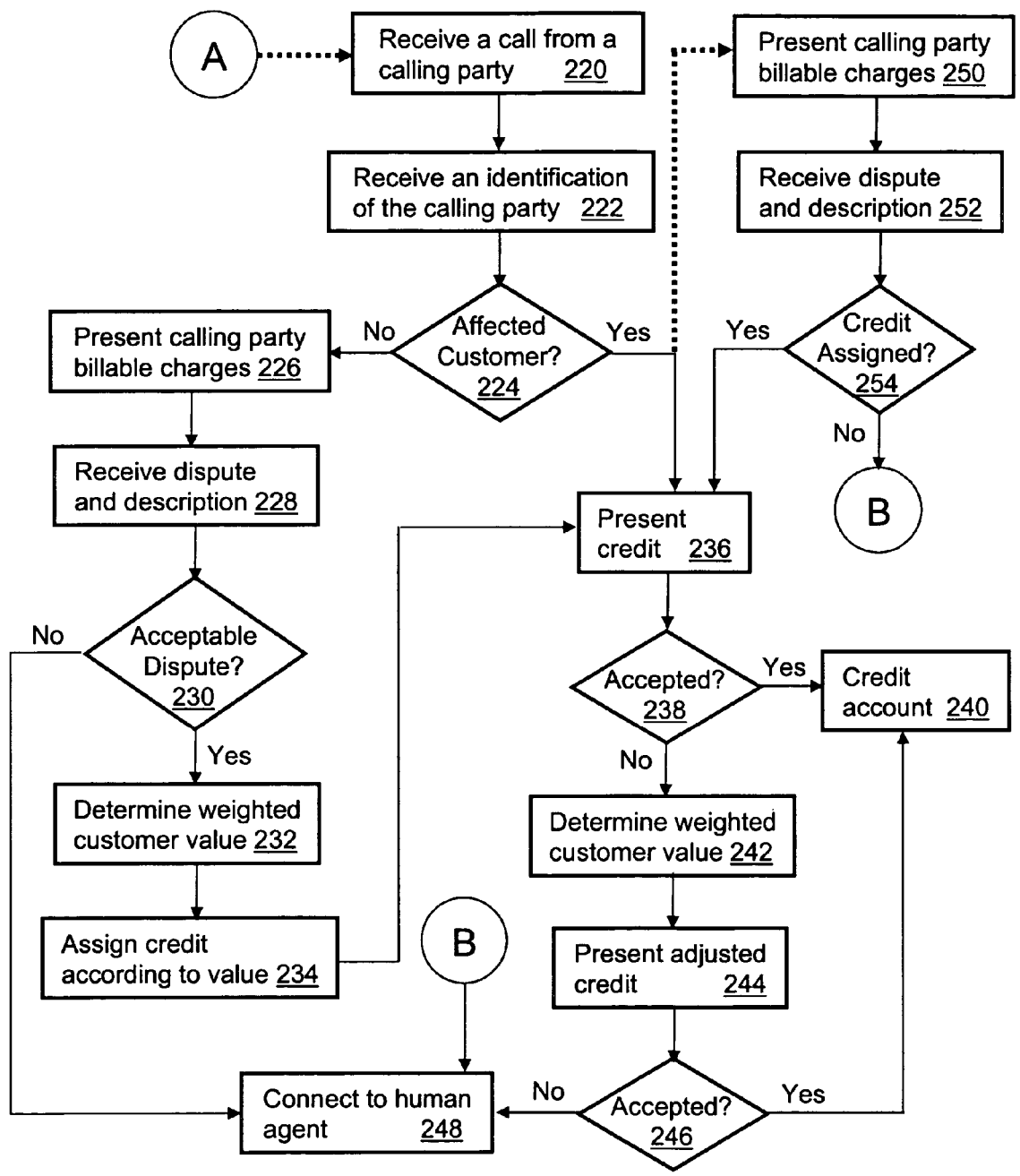

FIGS. 2-3 depict flowcharts of a method 200 operating in the AMS 100 according to an embodiment of the present invention. FIG. 2 illustrates a background process operating in the AMS 100 for automatically generating credit assignments to customers 108. This background process begins with step 202 where the AMS 100 is programmed to monitor service outages. As noted earlier, this step 202 can be performed by querying the activity-based tracking system 120 for outages. The AMS 100 continues to monitor for outages of network 101 until such time an outage is detected in step 204. Once detected, the AMS 100 proceeds to step 206 to identify those customers who have been affected by the service outage.

The term "affected" as used in step 206 can have a broad or narrow meaning. In its broadest meaning, affected can mean any customer who could have been impacted by the outage whether or not they were actively engaged using said service. In its narrowest meaning, affected means only those customers who were impacted by the outage because they were in the midst of using service and were interrupted by the outage, or attempted to use service during the outage and were unable to. The AMS 100 can programmed to monitor at the activity-based tracking system 130 any meaning for this term that is suitable for general business practices of the service provider.

In step 208, the AMS 100 assigns a credit to each of the affected customers identified in step 206. As just noted, the selection of customers given credit can be narrowed to those who were actively using the service or attempted to use the service during the outage. Otherwise, credit can be given to a broader group of customers who were or could have been affected by the outage. The credit can be determined according to any method suitable for the present invention. For example, the AMS 100 can be programmed with business rules for categorizing customers and providing weighted values thereto. Customers 108 can be categorized, for example, by business, or consumer. Additionally, a weighted customer value can be created on the basis of, for example, longevity of the customer, credit rating of the customer, promptness of the customer to pay bills, number of services procured by said customer, and so on. Additionally, for highly valued customers (such as business clients), credit can be provided on the basis of meaningful rather than prorated credit. That is, if a four hour outage constitutes a nominal credit value (e.g., $2.55), the AMS 100 can be programmed to supply a week, or a month worth of credit to select valued customers, thereby conveying to said customer that the service provider understands the value of time in a business setting and values the customer's continued business.

Once credits have been assigned, the AMS 100 can be programmed to proactively credit the accounts of the affected customers and notify them of this credit redemption in step 210. Notification can be performed by any available communications medium such as, for example, an over-the-air SMS (Short Message Services) wireless message, an email, a posting on an Internet website, and/or conventional postal service correspondence. The notification can include the credit amount and a suitable explanation for the credit. It can also include a legal disclaimer waiving liability for any damage or loss of profit caused to the affected customers. From step 210, the AMS 100 repeats the foregoing monitoring and credit generation steps.

Alternatively, the AMS 100 can be programmed to wait for a proactive step from the customers (as will be described in FIG. 3) before redeeming the credit of any of the affected customers. In this embodiment, the AMS 100 can be programmed to detect when the credit becomes stale for failure of a customer to redeem its credit within a predetermined period set by the AMS 100. If period has not expired, the AMS 100 returns to step 202 to repeat the process described above. If an expiration is detected, then said credit is flagged in step 214 and processed in step 216. Step 216 can be represented by any number of embodiments suitable to the present invention. For example, the AMS 100 can be programmed to cancel the flagged credit indefinitely, discount the credit, or cancel the credit after a second predetermined period expires.

The steps described in FIG. 2 can be performed as a background process that periodically operates in the AMS 100. In the foreground, the AMS 100 can operate the method depicted in FIG. 3 for processing calls from customers 108. In this embodiment, the activities of the background process of FIG. 2 are made known to the method shown in FIG. 3. Accordingly, this embodiment begins with step 220 where the AMS 100 receives a call from a calling party 108. The call can be a conventional voice call such as VoIP or a circuit switched voice call, or an Internet access. In the former, the AMS 100 can employ a conventional IVR function, while in the latter the AMS 100 can employ conventional techniques for presenting a webpage to its customers and performing exchanges with the customer therewith.

In step 222, the AMS 100 receives an identification of the calling party. The identification can be a caller ID, an account number, social security number, or other form of identification that the AMS 100 can utilize to identify the customer from one of its databases. Once the caller is identified, in step 224 the AMS 100 determines if said caller is one of the affected parties identified by the background process of FIG. 2. If so, the AMS 100 has two embodiments if can apply.

In a first embodiment, the AMS 100 can present the caller a credit for an identified outage. The presentation can be accompanied with an apology for the interruption in service, a disclaimer of liability, and/or any other message that will make the customer feel that the service provider values the customer's business. The AMS 100 then queries the customer in step 238 whether this credit is acceptable to said customer. Acceptance can be initiated by the caller by stating "Yes", or depressing an acceptance button on a webpage. If the caller accepts, the AMS 100 then credits the customer's account in step 240, and can provide a message such as thanking the customer for its understanding and/or other comforting statement recognizing the customer as a valued client.

If the caller rejects the offered credit, then the AMS 100 proceeds to step 242 where it determines a weighted customer value. The weighted customer value (as described earlier) gives the AMS 100 an indication how important this customer is to the service provider. Based on this value, the AMS 100 can be programmed to adjust the credit and present said adjustment in step 244. If the caller accepts the adjusted credit in step 246, then the customer's account is credited in step 240 as described before. If, on the other hand, the customer rejects this second credit offer, the AMS 100 can redirect the caller to a human agent in step 248 that is trained by the service provider according to its policies to address customer disputes.

Alternatively, the AMS 100 can proceed to step 250 where it presents the calling party billable charges for the customer to review. In step 252, the AMS 100 receives a disputed charge from the customer 108. If in step 254 the AMS 100 detects that the disputed charge is one that has been assigned a credit due to an outage, the AMS 100 proceeds to step 236 and subsequent steps as described earlier. If not, the AMS 100 directs the caller to the agent 248.

Referring back to step 224, if the calling party is not an affected customer, the AMS 100 proceeds to step 226 where it presents the customer billable charges for services rendered. In step 228, the AMS 100 receives a disputed charge and corresponding description from the customer 108. The description, for example, can be one of a number of options presented to the customer for explaining the dispute. The AMS 100 can be programmed to compare the description selected to one or more acceptable disputes identified by the service provider. If there is a match, then the AMS 100 proceeds to step 232 where it determines a weighted customer value (as described in step 242). A credit is therefore assigned in step 234 from this weighted value and according to business rules established by the service provider. The AMS 100 then proceeds to step 236 and subsequent steps as described above. If the disputed charge, and the description given is rejected in step 230, the AMS 100 directs the caller to the agent in step 248.

It should be evident that the automated billing and credit method described in FIGS. 2 and 3 substantially eliminates the burden of routine tasks imposed on human agents. Moreover, the AMS 100 can operate 24 hours a day everyday of the year. Thus, customers 108 can be served at their convenience, thereby significantly improving customer satisfaction and loyalty to the service provider.

It should also be evident by now that the present invention can be realized in hardware, software, or a combination of hardware and software. Moreover, the present invention can be realized in a centralized fashion, or in a distributed fashion where different elements are spread across several interconnected processors. Thus, any kind of computing device or other apparatus adapted for carrying out method 200 described above is suitable for the present invention.

It should be also evident that the present invention may be used for many applications. Thus, although the description is made for particular arrangements and methods, the intent and concept of the invention is suitable and applicable to other arrangements and applications not described herein. For example, method 200 can be reduced to steps 202, 204, 206 and 208 within the scope of the claimed invention. It would be clear therefore to those skilled in the art that modifications to the disclosed embodiments described herein could be effected without departing from the spirit and scope of the invention.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

A software program in the present context means any expression, in any language, code or notation, of a set of instructions intended to cause a system having an information processing capability to perform a particular function either directly or after either or both of the following: a) conversion to another language, code or notation; b) reproduction in a different material form.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, other re-writable (volatile) memories or Signals containing instructions. A digital file attachment to e-mail or other self-contained information archive or set of archives sent through signals is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art that are applicable to the present invention. Such standards are periodically superseded by faster or more efficient equivalents having essentially the same functions. Accordingly, replacement standards and protocols having the same functions are considered equivalents.

The described embodiments ought to be construed to be merely illustrative of some of the more prominent features and applications of the invention. It should also be understood that the claims are intended to cover the structures described herein as performing the recited function and not only structural equivalents. Therefore, equivalent structures that read on the description should also be construed to be inclusive of the scope of the invention as defined in the following claims. Thus, reference should be made to the following claims, rather than to the foregoing specification, as indicating the scope of the invention.

What is claimed is:

1. In an account management system coupled to a service center serving a plurality of customers, a computer-readable storage medium comprising computer instructions for:
    monitoring service outages of the service center;
    detecting a service outage;
    identifying one or more customers affected by the service outage; and
    assigning a credit to each of the affected one or more customers.

2. The storage medium of claim 1, comprising computer instructions for:
    receiving a call from a calling party;
    receiving identification from the calling party;
    determining from the identification whether the calling party is one among the affected customers;
    presenting the calling party a credit if said calling party is identified as one of the affected customers and has been assigned said credit.

3. The storage medium of claim 2, wherein said call corresponds to one among a group of calls comprising a voice call, and an Internet access, and wherein the storage medium comprises computer instructions for processing any one of said group of calls.

4. The storage medium of claim 1, comprising computer instructions for:
    receiving a call from a calling party;
    receiving identification from the calling party;
    presenting the calling party one or more billable charges corresponding to one or more services provided to said calling party according to said identification;
    receiving a dispute from the calling party for one among said billable charges; and
    presenting the calling party a credit for said charge if said credit has been assigned thereto.

5. The storage medium of claim 1, comprising computer instructions for:
    receiving a call from a calling party;
    receiving identification from the calling party;
    presenting the calling party one or more billable charges corresponding to one or more services provided to said calling party according to said identification;
    receiving a dispute and a corresponding description from the calling party for one among said billable charges;
    determining whether the dispute description corresponds to one or more acceptable disputes if no credit has been assigned to said disputed charge;

assigning a credit according to one or more business rules if the dispute description corresponds to one or more acceptable disputes and no prior credit has been assigned to said disputed charge; and presenting the credit to the calling party.

6. The storage medium of claim 5, comprising computer instructions for:
   querying the calling party for acceptance of the credit; and
   applying said credit to the disputed charge upon receiving an acceptance from said calling party.

7. The storage medium of claim 5, comprising computer instructions for:
   determining a weighted customer value for said calling party upon receiving a rejection from said calling party; and
   presenting an adjusted credited according to said customer value.

8. The storage medium of claim 5, comprising computer instructions for interconnecting said calling party to a human agent upon receiving a rejection from said calling party.

9. The storage medium of claim 1, comprising computer instructions for:
   flagging a credit assigned to an affected customer if said customer does not redeem the credit within a predetermined period; and
   processing said flagged credit according to one among a group of options comprising canceling the credit indefinitely, discounting the credit, and canceling the credit after a second predetermined period expires.

10. The storage medium of claim 1, comprising computer instructions for:
    crediting accounts of said affected customers according to their respective assigned credit; and
    notifying the affected customers of their credit according to at least one among a group of mediums comprising email, an Internet website, wireless messages, and postal service correspondence.

11. The storage medium of claim 1, comprising computer instructions for determining the credit for each affected customer according to a corresponding one among a group of customer categories, each category having a corresponding weighted customer value.

12. An account management system coupled to a service center serving a plurality of customers, comprising:
    a communications interface;
    a memory; and
    a controller programmed to:
    monitor service outages of the service center;
    detect a service outage;
    identify one or more customers affected by the service outage; and
    assign a credit to each of the affected one or more customers.

13. The account management system of claim 12, wherein the controller is programmed to:
    receive a call from a calling party;
    receive identification from the calling party;
    determine from the identification whether the calling party is one among the affected customers;
    present the calling party a credit if said calling party is identified as one of the affected customers and has been assigned said credit.

14. The account management system of claim 13, wherein said call corresponds to one among a group of calls comprising a voice call, and an Internet access, and wherein the controller is programmed to process any one of said group of calls.

15. The account management system of claim 12, wherein the controller is programmed to:
    receive a call from a calling party;
    receive identification from the calling party;
    present the calling party one or more billable charges corresponding to one or more services provided to said calling party according to said identification;
    receive a dispute from the calling party for one among said billable charges; and
    present the calling party a credit for said charge if said credit has been assigned thereto.

16. The account management system of claim 12, wherein the controller is programmed to:
    receive a call from a calling party;
    receive identification from the calling party;
    present the calling party one or more billable charges corresponding to one or more services provided to said calling party according to said identification;
    receive a dispute and a corresponding description from the calling party for one among said billable charges;
    determine whether the dispute description corresponds to one or more acceptable disputes if no credit has been assigned to said disputed charge;
    assign a credit according to one or more business rules if the dispute description corresponds to one or more acceptable disputes and no prior credit has been assigned to said disputed charge; and
    present the credit to the calling party.

17. The account management system of claim 16, wherein the controller is programmed to:
    query the calling party for acceptance of the credit; and
    apply said credit to the disputed charge upon receiving an acceptance from said calling party.

18. The account management system of claim 16, wherein the controller is programmed to:
    determine a weighted customer value for said calling party upon receiving a rejection from said calling party; and
    present an adjusted credited according to said customer value.

19. The account management system of claim 12, wherein the controller is programmed to:
    flag a credit assigned to an affected customer if said customer does not redeem the credit within a predetermined period; and
    process said flagged credit according to one among a group of options comprising canceling the credit indefinitely, discounting the credit, and canceling the credit after a second predetermined period expires.

20. The account management system of claim 12, wherein the controller is programmed to:
    credit accounts of said affected customers according to their respective assigned credit; and
    notify the affected customers of their credit according to at least one among a group of mediums comprising email, an Internet website, wireless messages, and postal service correspondence.

21. The account management system of claim 12, wherein the controller is programmed to determine the credit for each affected customer according to a corresponding one among a group of customer categories, each category having a corresponding weighted customer value.

22. In an account management system coupled to a service center serving a plurality of customers, a method comprising the steps of:
    monitoring service outages of the service center;
    detecting a service outage;
    identifying one or more customers affected by the service outage; and
    assigning a credit to each of the affected one or more customers.

* * * * *